(12) United States Patent
Yadav et al.

(10) Patent No.: US 12,264,590 B2
(45) Date of Patent: Apr. 1, 2025

(54) FAN ASSEMBLY FOR AN ENGINE HAVING REDUNDANT TRUNNION RETENTION

(71) Applicant: General Electric Company, Schenectady, NY (US)

(72) Inventors: Abhijeet Jayshingrao Yadav, Karad (IN); Nicholas Joseph Kray, Mason, OH (US); Nitesh Jain, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/366,800

(22) Filed: Aug. 8, 2023

(65) Prior Publication Data

US 2025/0052172 A1 Feb. 13, 2025

(51) Int. Cl.
| | |
|---|---|
| *B64C 11/06* | (2006.01) |
| *F01D 21/04* | (2006.01) |
| *F04D 29/18* | (2006.01) |
| *F04D 29/46* | (2006.01) |

(52) U.S. Cl.
CPC ............ *F01D 21/045* (2013.01); *B64C 11/06* (2013.01); *F04D 29/181* (2013.01); *F04D 29/462* (2013.01); *F05D 2220/36* (2013.01); *F05D 2260/70* (2013.01)

(58) Field of Classification Search
CPC ....... B64C 11/04; B64C 11/06; F01D 5/3023; F01D 5/303; F01D 5/3038; F04D 29/181; F04D 29/325; F04D 29/329

See application file for complete search history.

(56) References Cited

U.S. PATENT DOCUMENTS

| | | |
|---|---|---|
| 2,144,428 A | 1/1939 | Martin |
| 2,499,837 A | 3/1950 | Sheets et al. |
| 3,531,144 A | 9/1970 | Bizilia |
| 3,832,076 A | 8/1974 | Gehrke |
| 4,019,824 A | 4/1977 | Percy |
| 4,077,232 A | 3/1978 | Grosseau |
| 4,124,318 A | 11/1978 | Sagady |
| 4,585,390 A | 4/1986 | Pirtle et al. |
| 4,738,590 A | 4/1988 | Butler |

(Continued)

FOREIGN PATENT DOCUMENTS

| | | | | |
|---|---|---|---|---|
| GB | 2192943 A | 1/1988 | | |
| WO | WO-2023031522 A1 * | 3/2023 | ............ | B64C 11/06 |

*Primary Examiner* — Christopher R Legendre
(74) *Attorney, Agent, or Firm* — Dority & Manning, P.A.

(57) ABSTRACT

A fan assembly for an engine has a fan blade, a disk having a disk segment, a trunnion mechanism having a trunnion extending at least partially through the disk segment, and first and second attachment systems. The trunnion has a platform and a shaft. The fan blade is adjacent to the platform of the trunnion. The trunnion is attached to the disk segment using the first attachment system along a preload path. The first and second attachment systems further include first and second retention features, respectively, separate from the preload path. During normal operation of the fan assembly, the first attachment system retains the trunnion within the disk along a first load path. Upon a failure in the trunnion, the first and second retention features together retain the trunnion within the disk segment along a second load path, the first load path being different than the second load path.

20 Claims, 11 Drawing Sheets

(56) References Cited

U.S. PATENT DOCUMENTS

| | | |
|---|---|---|
| 5,015,150 A | 5/1991 | Rohra |
| 5,118,256 A | 6/1992 | Violette et al. |
| 5,129,786 A | 7/1992 | Gustafson |
| 5,263,898 A | 11/1993 | Elston, III et al. |
| 5,282,720 A | 2/1994 | Szpunar |
| 5,374,145 A | 12/1994 | Mairesse et al. |
| 6,126,371 A | 10/2000 | McCloskey |
| 6,884,028 B2 | 4/2005 | Brauer et al. |
| 8,794,923 B2 | 8/2014 | Tirone, III et al. |
| 9,145,776 B2 | 9/2015 | Mackie et al. |
| 9,410,446 B2 | 8/2016 | Benjamin et al. |
| 9,970,313 B2 | 5/2018 | Beaven et al. |
| 10,077,674 B2 | 9/2018 | Miller et al. |
| 10,378,368 B2 | 8/2019 | Tajan et al. |
| 10,934,844 B2 | 3/2021 | Engel et al. |
| 11,053,812 B2 | 7/2021 | Miller et al. |
| 11,125,097 B2 | 9/2021 | Feldmann |
| 12,012,201 B2 * | 6/2024 | Cottet .................. F04D 29/323 |
| 2005/0284150 A1 | 12/2005 | Dittmar et al. |
| 2008/0247877 A1 | 10/2008 | Gallet |
| 2009/0005306 A1 | 1/2009 | Abad et al. |
| 2009/0015012 A1 | 1/2009 | Metzler et al. |
| 2009/0053065 A1 | 2/2009 | Oka |
| 2009/0245706 A1 | 10/2009 | Morishita et al. |
| 2010/0239421 A1 | 9/2010 | Boston et al. |
| 2012/0045334 A1 | 2/2012 | Bouru et al. |
| 2013/0003945 A1 | 1/2013 | Caldwell et al. |
| 2013/0034389 A1 | 2/2013 | Lazzarin et al. |
| 2013/0094943 A1 | 4/2013 | Bouru et al. |
| 2013/0343896 A1 | 12/2013 | Mackie et al. |
| 2014/0003945 A1 | 1/2014 | Perdrigeon et al. |
| 2021/0215062 A1 | 7/2021 | Miller et al. |

\* cited by examiner

FAN ASSEMBLY FOR AN ENGINE HAVING REDUNDANT TRUNNION RETENTION

FIELD

The present disclosure relates generally to a fan assembly for a gas turbine engine, or more particularly to redundant fan blade retention features for a fan assembly for a gas turbine engine.

BACKGROUND

A gas turbine engine generally includes a fan section and a core arranged in flow communication with one another. The core of the gas turbine engine generally includes, in serial flow order, a compressor section, a combustion section, a turbine section, and an exhaust section. In operation, an airflow is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the combustion section drives the combustion section and is then routed through the exhaust section, e.g., to atmosphere. In particular configurations, the turbine section is mechanically coupled to the compressor section by a shaft extending along an axial direction of the gas turbine engine.

The fan section includes a fan assembly having a plurality of fan blades having a radius larger than the core of the gas turbine engine. The plurality of fan blades is typically driven by the shaft. Each fan blade in the plurality of blades can be attached to a trunnion mechanism, and the trunnion mechanism in turn attached to a disk. The trunnion mechanism is rotatable relative to the disk to allow for varying a pitch of the plurality of fan blades. Accordingly, the trunnion mechanism may be attached to the disk using various bearings and other accompanying structure.

To increase a safety of the gas turbine engine, components downstream of the fan section are designed with the possibility in mind that the attachment system attaching the trunnion to the disk may fail. However, such a configuration can decrease an efficiency of the gas turbine engine. For example, an increased weight of armor added to a fuselage of the gas turbine engine can reduce an efficiency of the gas turbine engine.

Accordingly, a fan assembly for a gas turbine engine having one or more features to retain the trunnion, and the fan blade attached thereto, to the disk in the event of a failure of an attachment system would be beneficial.

BRIEF DESCRIPTION OF THE DRAWINGS

A full and enabling disclosure directed to one of ordinary skill in the art, is set forth in the specification, which refers to the appended Figures, in which.

Figure 1:
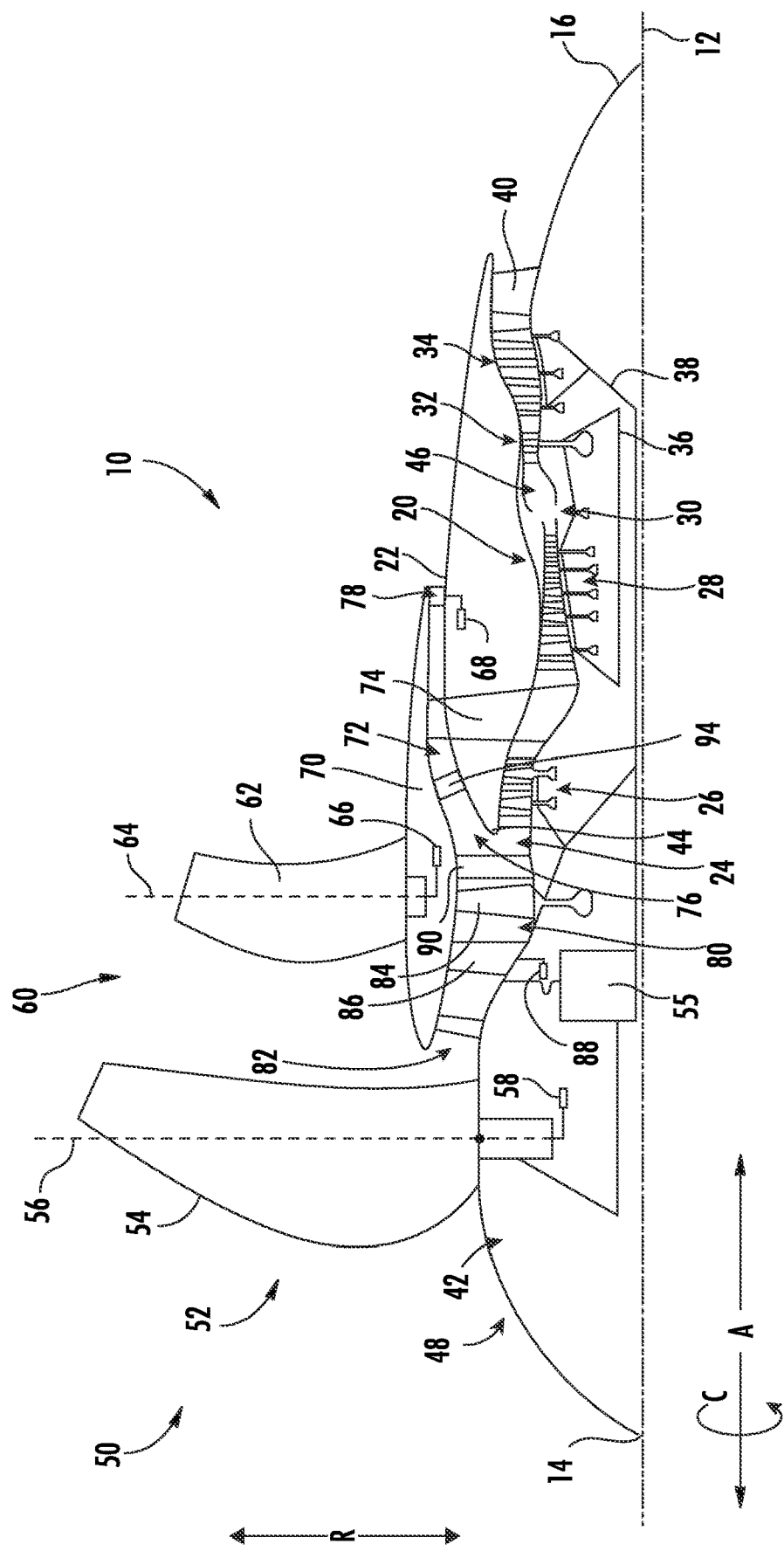
FIG. 1 is a schematic cross-sectional view of a gas turbine engine having an unducted fan according to an embodiment of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The singular forms "a", "an", and "the" include plural references unless the context clearly dictates otherwise.

The term "at least one of" in the context of, e.g., "at least one of A, B, or C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines as may be used in the present disclosure include unducted turbofan engines, ducted turbofan engines, and/or turboprop engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

As used herein, the term "rotor" refers to any component of a rotary machine, such as a turbine engine, that rotates about an axis of rotation. By way of example, a rotor may include a shaft or a spool of a rotary machine, such as a turbine engine.

As used herein, the term "stator" refers to any component of a rotary machine, such as a turbine engine, that has a coaxial configuration and arrangement with a rotor of the rotary machine. A stator may be disposed radially inward or radially outward along a radial axis in relation to at least a portion of a rotor. Additionally, or in the alternative, a stator may be disposed axially adjacent to at least a portion of a rotor.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled", "fixed", "attached to", and the like refer to both direct coupling, fixing, or attaching, as well as indirect coupling, fixing, or attaching through one or more intermediate components or features, unless otherwise specified herein.

As used herein, the terms "first", "second", "third" and so on may be used interchangeably to distinguish one component from another and are not intended to signify location or importance of the individual components.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting a second wall/surface).

As used herein, the term "integral" or "unitary" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to a fan assembly having a redundant/fail-safe blade retention system in addition to the primary load path. In certain engine architectures, the fan blade roots, also referred to as a trunnion, are attached to the fan disk through bearings to achieve the desired fan blade pitch change. This bearing/attachment system is designed for certain loading conditions as well as bird ingestion loads and includes a redundant/fail-safe blade retention system that is designed to have a minimum impact on the overall weight of the fan assembly. In particular, the fan assembly includes a fan blade, a trunnion mechanism having a trunnion, a first attachment system, and a second attachment system, and a disk having a disk segment. The trunnion extends at least partially through the disk segment and is attached to the disk segment using the first attachment system along a preload path (i.e., the load path in which the fan assembly is designed for in normal operations). In addition, the first and second attachment systems further include first and second retention features, respectively, that are separate from the preload path so as to define an alternative, fail safe load path.

Thus, during normal operation of the engine, the first attachment system secures the trunnion to the disk segment along a first load path defined through the trunnion, the first attachment system, the disk, and the fan blade. However, upon a failure in the trunnion (thereby preventing portions of the first attachment system from functioning as designed), the first and second retention features of the first and second attachment systems, respectively, together retain the trunnion within the disk segment along a second load path (i.e., the alternative, fail safe load path) that is different that the first load path.

In at least certain embodiments, the blade retention system may be incorporated into a fan assembly having an unducted configuration (e.g., a fan assembly without an outer nacelle surrounding the fan assembly). In such a configuration, the blade retention system may reduce a likelihood of a fan blade being released and contacting, e.g., a fuselage of an aircraft including an engine with the unducted fan assembly.

Referring now to the drawings, wherein identical numerals indicate the same elements throughout the figures, FIG. 1 is a schematic cross-sectional view of a gas turbine engine 10 in accordance with an embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 10 may be referred to as an "unducted turbofan engine." In addition, the engine 10 of FIG. 1 includes a third stream extending from the compressor section to a rotor assembly flowpath over the turbomachine, as will be explained in more detail below.

For reference, the engine 10 defines an axial direction A, a radial direction R, and a circumferential direction C. Moreover, the engine 10 defines an axial centerline or longitudinal axis 12 that extends along the axial direction A. In general, the axial direction A extends parallel to the longitudinal axis 12, the radial direction R extends outward from and inward to the longitudinal axis 12 in a direction orthogonal to the axial direction A, and the circumferential direction extends three hundred sixty degrees (360°) around the longitudinal axis 12. The engine 10 extends between a forward end 14 and an aft end 16, e.g., along the axial direction A.

The engine 10 includes a turbomachine 20 and a rotor assembly, also referred to a fan section 50, positioned upstream thereof. Generally, the turbomachine 20 includes, in serial flow order, a compressor section, a combustion section, a turbine section, and an exhaust section. Particularly, as shown in FIG. 1, the turbomachine 20 includes a core cowl 22 that defines an annular core inlet 24. The core cowl 22 further encloses at least in part a low pressure system and a high pressure system. For example, the core cowl 22 depicted encloses and supports at least in part a booster or low pressure ("LP") compressor 26 for pressurizing the air that enters the turbomachine 20 through core inlet 24. A high pressure ("HP"), multi-stage, axial-flow compressor 28 receives pressurized air from the LP compressor 26 and further increases the pressure of the air. The pressurized air stream flows downstream to a combustor 30 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems and are not meant to imply any absolute speed and/or pressure values.

The high energy combustion products flow from the combustor 30 downstream to a HP turbine 32. The HP turbine 32 drives the HP compressor 28 through a high pressure shaft 36. In this regard, the HP turbine 32 is drivingly coupled with the HP compressor 28. The high energy combustion products then flow to a LP turbine 34. The LP turbine 34 drives the LP compressor 26 and components of the fan section 50 through a LP shaft 38. In this regard, the LP turbine 34 is drivingly coupled with the LP compressor 26 and components of the fan section 50. The LP shaft 38 is coaxial with the HP shaft 36 in this example embodiment. After driving each of the HP and LP turbines 32, 34, the combustion products exit the turbomachine 20 through a turbomachine exhaust nozzle 40.

Accordingly, the turbomachine 20 defines a working gas flowpath or core duct 46 that extends between the core inlet 24 and the turbomachine exhaust nozzle 40. The core duct 46 is an annular duct positioned generally inward of the core cowl 22 along the radial direction R. The core duct 46 (e.g., the working gas flowpath through the turbomachine 20) may be referred to as a second stream.

The fan section 50 includes a fan 52, which is the primary fan in this example embodiment. For the depicted embodiment of FIG. 1, the fan 52 is an open rotor or unducted fan 52. In such a manner, the engine 10 may be referred to as an open rotor engine.

As depicted, the fan 52 includes an array of fan blades 54 (only one shown in FIG. 1). The fan blades 54 are rotatable, e.g., about the longitudinal axis 12. As noted above, the fan 52 is drivingly coupled with the low pressure turbine 34 via the LP shaft 38. For the embodiments shown in FIG. 1, the fan 52 is coupled with the LP shaft 38 via a speed reduction gearbox 55, e.g., in an indirect-drive or geared-drive configuration.

Moreover, the array of fan blades 54 can be arranged in equal spacing around the longitudinal axis 12. Each fan blade 54 has a root and a tip and a span defined therebetween. Each fan blade 54 defines a central blade axis 56. For this embodiment, each fan blade 54 of the fan 52 is rotatable about its central blade axis 56, e.g., in unison with one another. One or more actuators 58 are provided to facilitate such rotation and therefore may be used to change a pitch of the fan blades 54 about their respective central blades' axes 56.

The fan section 50 further includes a fan guide vane array 60 that includes fan guide vanes 62 (only one shown in FIG. 1) disposed around the longitudinal axis 12. For this embodiment, the fan guide vanes 62 are not rotatable about the longitudinal axis 12. Each fan guide vane 62 has a root and a tip and a span defined therebetween. The fan guide vanes 62 may be unshrouded as shown in FIG. 1 or, alternatively, may be shrouded, e.g., by an annular shroud spaced outward from the tips of the fan guide vanes 62 along the radial direction R or attached to the fan guide vanes 62.

Each fan guide vane 62 defines a central blade axis 64. For this embodiment, each fan guide vane 62 of the fan guide vane array 60 is rotatable about its respective central blade axis 64, e.g., in unison with one another. One or more actuators 66 are provided to facilitate such rotation and therefore may be used to change a pitch of the fan guide vane 62 about its respective central blade axis 64. However, in other embodiments, each fan guide vane 62 may be fixed or unable to be pitched about its central blade axis 64. The fan guide vanes 62 are mounted to the fan cowl 70.

As shown in FIG. 1, in addition to the fan 52, which is unducted, a ducted fan 84 is included aft of the fan 52, such that the engine 10 includes both a ducted and an unducted fan which both serve to generate thrust through the movement of air without passage through at least a portion of the turbomachine 20 (e.g., without passage through the HP compressor 28 and combustion section for the embodiment depicted). The ducted fan 84 is rotatable about the same axis (e.g., the longitudinal axis 12) as the fan blade 54. The ducted fan 84 is, for the embodiment depicted, driven by the low pressure turbine 34 (e.g., coupled to the LP shaft 38). In the embodiment depicted, as noted above, the fan 52 may be referred to as the primary fan, and the ducted fan 84 may be referred to as a secondary fan. It will be appreciated that these terms "primary" and "secondary" are terms of convenience, and do not imply any particular importance, power, or the like.

The ducted fan 84 includes a plurality of fan blades (not separately labeled in FIG. 1) arranged in a single stage, such that the ducted fan 84 may be referred to as a single stage fan. The fan blades of the ducted fan 84 can be arranged in equal spacing around the longitudinal axis 12. Each blade of the ducted fan 84 has a root and a tip and a span defined therebetween.

The fan cowl 70 annularly encases at least a portion of the core cowl 22 and is generally positioned outward of at least a portion of the core cowl 22 along the radial direction R. Particularly, a downstream section of the fan cowl 70 extends over a forward portion of the core cowl 22 to define a fan duct flowpath, or simply a fan duct 72. According to this embodiment, the fan flowpath or fan duct 72 may be understood as forming at least a portion of the third stream of the engine 10.

Incoming air may enter through the fan duct 72 through a fan duct inlet 76 and may exit through a fan exhaust nozzle 78 to produce propulsive thrust. The fan duct 72 is an annular duct positioned generally outward of the core duct 46 along the radial direction R. The fan cowl 70 and the core cowl 22 are connected together and supported by a plurality of substantially radially extending, circumferentially spaced stationary struts 74 (only one shown in FIG. 1). The stationary struts 74 may each be aerodynamically contoured to direct air flowing thereby. Other struts in addition to the stationary struts 74 may be used to connect and support the fan cowl 70 and/or core cowl 22. In many embodiments, the fan duct 72 and the core duct 46 may at least partially co-extend (generally axially) on opposite sides (e.g., opposite radial sides) of the core cowl 22. For example, the fan duct 72 and the core duct 46 may each extend directly from a leading edge 44 of the core cowl 22 and may partially co-extend generally axially on opposite radial sides of the core cowl 22.

The engine 10 also defines or includes an inlet duct 80. The inlet duct 80 extends between the engine inlet 82 and the core inlet 24/fan duct inlet 76. The engine inlet 82 is defined generally at the forward end of the fan cowl 70 and is positioned between the fan 52 and the fan guide vane array 60 along the axial direction A. The inlet duct 80 is an annular duct that is positioned inward of the fan cowl 70 along the radial direction R. Air flowing downstream along the inlet duct 80 is split, not necessarily evenly, into the core duct 46 and the fan duct 72 by a fan duct splitter or leading edge 44 of the core cowl 22. In the embodiment depicted, the inlet duct 80 is wider than the core duct 46 along the radial direction R. The inlet duct 80 is also wider than the fan duct 72 along the radial direction R.

Notably, for the embodiment depicted, the engine 10 further includes an array of inlet guide vanes 86 positioned in the inlet duct 80 upstream of the ducted fan 84 and downstream of the engine inlet 82. The array of inlet guide vanes 86 are arranged around the longitudinal axis 12. For this embodiment, the inlet guide vanes 86 are not rotatable about the longitudinal axis 12. Each inlet guide vanes 86 defines a central blade axis (not labeled for clarity), and is rotatable about its respective central blade axis, e.g., in unison with one another. In such a manner, the inlet guide vanes 86 may be considered a variable geometry component. One or more actuators 88 are provided to facilitate such rotation and therefore may be used to change a pitch of the inlet guide vanes 86 about their respective central blade axes. However, in other embodiments, each inlet guide vanes 86 may be fixed or unable to be pitched about its central blade axis.

Further, located downstream of the ducted fan 84 and upstream of the fan duct inlet 76, the engine 10 includes an array of outlet guide vanes 90. As with the array of inlet guide vanes 86, the array of outlet guide vanes 90 are not rotatable about the longitudinal axis 12. However, for the embodiment depicted, unlike the array of inlet guide vanes 86, the array of outlet guide vanes 90 are configured as fixed-pitch outlet guide vanes.

Further, it will be appreciated that for the embodiment depicted, the fan exhaust nozzle 78 of the fan duct 72 is further configured as a variable geometry exhaust nozzle. In such a manner, the engine 10 includes one or more actuators 68 for modulating the variable geometry exhaust nozzle. For example, the variable geometry exhaust nozzle may be configured to vary a total cross-sectional area (e.g., an area of the nozzle in a plane perpendicular to the longitudinal axis 12) to modulate an amount of thrust generated based on one or more engine operating conditions (e.g., temperature, pressure, mass flowrate, etc. of an airflow through the fan duct 72). A fixed geometry exhaust nozzle may also be adopted.

The combination of the array of inlet guide vanes 86 located upstream of the ducted fan 84, the array of outlet guide vanes 90 located downstream of the ducted fan 84, and the fan exhaust nozzle 78 may result in a more efficient generation of third stream thrust, $Fn_{3S}$, during one or more engine operating conditions.

Moreover, referring still to FIG. 1, in exemplary embodiments, air passing through the fan duct 72 may be relatively cooler (e.g., lower temperature) than one or more fluids utilized in the turbomachine 20. In this way, one or more heat exchangers 94 may be positioned in thermal communication with the fan duct 72. For example, one or more heat exchangers 94 may be disposed within the fan duct 72 and utilized to cool one or more fluids from the core engine with the air passing through the fan duct 72, as a resource for removing heat from a fluid, e.g., compressor bleed air, oil, or fuel.

Although not depicted, the heat exchanger 94 may be an annular heat exchanger extending substantially 360 degrees in the fan duct 72 (e.g., at least 300 degrees, such as at least 330 degrees). In such a manner, the heat exchanger 94 may effectively utilize the air passing through the fan duct 72 to cool one or more systems of the engine 10 (e.g., lubrication oil systems, compressor bleed air, electrical components, etc.). The heat exchanger 94 uses the air passing through the fan duct 72 as a heat sink and correspondingly increases the temperature of the air downstream of the heat exchanger 94 exiting the fan exhaust nozzle 78.

It should be appreciated that the engine 10 depicted in FIG. 1 and described herein is by way of example only, and that embodiments of the present disclosure may be incorporated in other gas turbine engines as well. For example, in other exemplary embodiments, embodiments of the present disclosure may further be incorporated into ducted turbofan engines (e.g., turbofan engines having an outer nacelle surrounding a plurality of fan blades of a fan).

Figure 2:
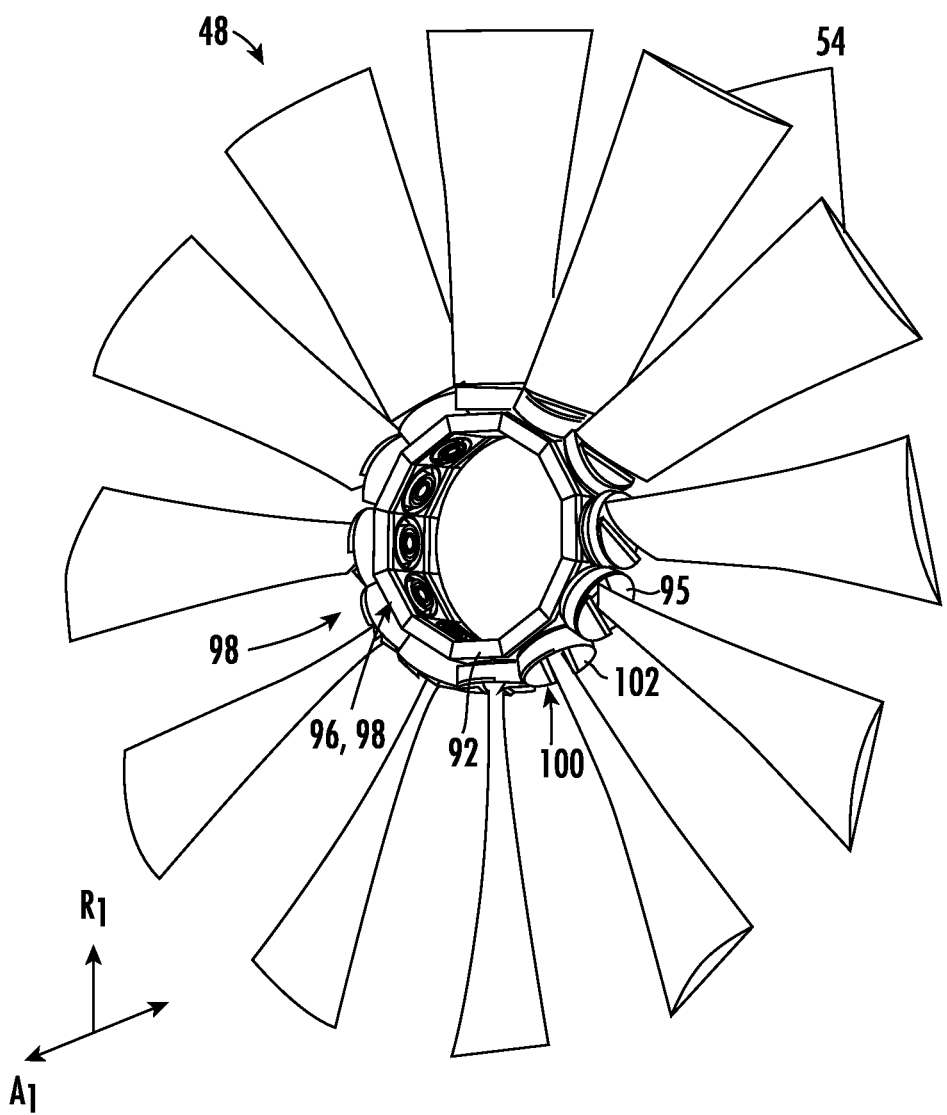
FIG. 2 is perspective view of a variable pitch fan of a gas turbine engine in accordance with an embodiment of the present disclosure.

Referring still to FIG. 1, and now also to FIG. 2, the fan section 50 includes a variable pitch fan assembly 48 having a plurality of the fan blades 54 coupled to a disk 42 in a spaced apart manner. The disk 42 may have a generally annular shape about the axial direction A1, as will be discussed below. The fan blades 54 extend outwardly from the disk 42 generally along the radial direction $R_1$. Each fan blade 54 is also rotatable relative to the disk 42 about central blade axis 56 by virtue of the fan blades 54 being operatively coupled to the actuator(s) 58 configured to collectively vary the pitch of the fan blades 54 in unison.

Referring particularly to FIG. 2, a perspective view of an embodiment of the fan assembly 48 of the fan section 50 of the engine 10 of FIG. 1 is illustrated. For the embodiment depicted, the fan assembly 48 includes twelve (12) fan blades 54. From a loading standpoint, such a blade count may allow a span of each fan blade 54 to be reduced such that the overall diameter of the fan assembly 48 may also be reduced. That said, in other embodiments, the fan assembly 48 may have any suitable blade count and any suitable diameter. In certain suitable embodiments, the fan includes at least eight (8) blades. In another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades.

Each fan blade 54 is attached to the disk 42 using a trunnion mechanism 100. More particularly, the disk 42 includes a plurality of disk segments 92 that are rigidly coupled together or integrally molded together in a generally annular shape (e.g., a polygonal shape). Each fan blade 54 is coupled to a respective disk segment 92 using a respective trunnion mechanism 100. For the embodiment depicted, each trunnion mechanism 100 includes a trunnion 102, a first attachment system 96, and a redundant, second attachment system 98.

Further, each trunnion 102 includes a platform 95 for attachment to a respective one of the fan blades 54 and a shaft 97 (see e.g., FIG. 3) that extends at least partially through a respective one of the disk segments 92. As will be discussed in greater detail herein, the trunnion 102 is attached to the disk segment 92 using the first and second attachment systems 96, 98, depending on whether a failure has occurred in the fan assembly 48.

Accordingly, the trunnion mechanism(s) 100 facilitates retaining its associated fan blade 54 on the disk 42, or disk segment 92, during operation of the fan assembly 48 and rotation of disk 42. More specifically, each trunnion mechanism 100 facilitates providing a load path from a respective fan blade 54 to a respective disk segment 92 for the centrifugal load generated by the fan blades 54 during rotation about the longitudinal axis 12 (FIG. 1). Further, the trunnion mechanism 100, or rather its first attachment system 96, facilitates a rotation of a respective fan blade 54 relative to disk 42 about the central blade axis 56 (FIG. 1).

Figure 3:
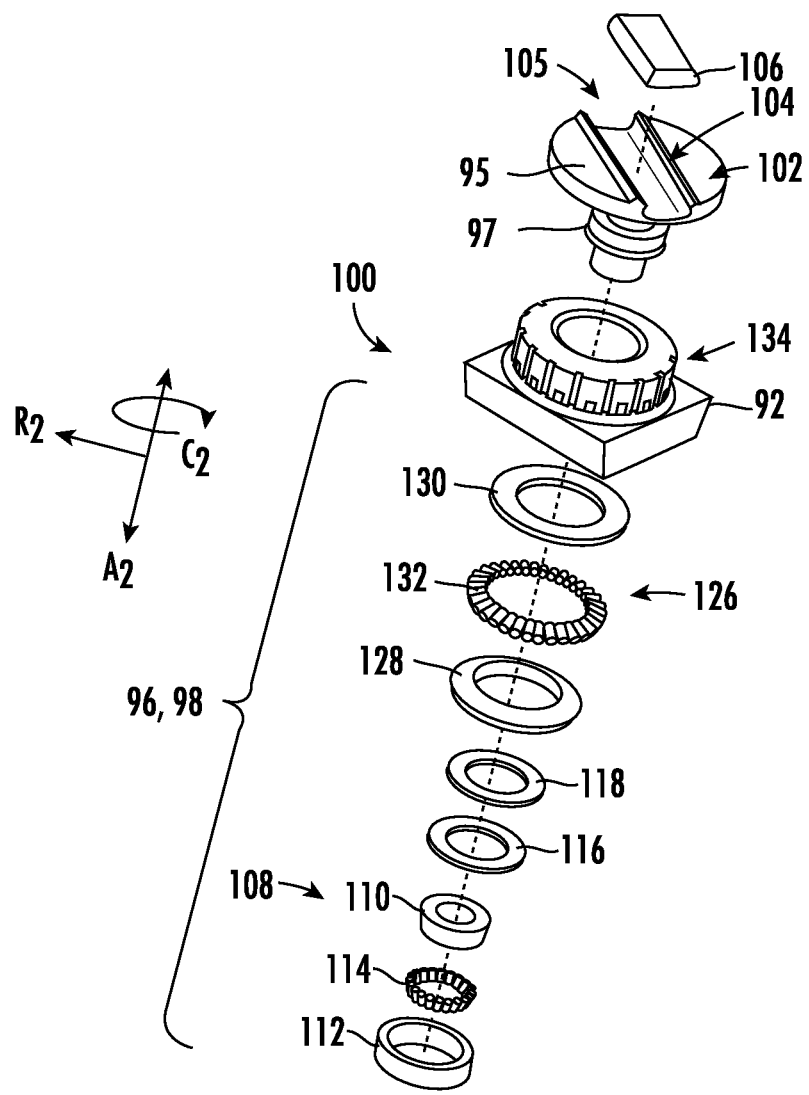
FIG. 3 is an exploded perspective view of a portion of a fan assembly of a gas turbine engine, particularly illustrating a disk segment, a trunnion mechanism, and first and second attachment systems in accordance with an embodiment of the present disclosure.

Referring now to FIG. 3, an individual disk segment 92 and trunnion mechanism 100 are each depicted in accordance with an embodiment of the present disclosure. More particularly, FIG. 3 provides an exploded perspective view of the disk segment 92 and trunnion mechanism 100 in accordance with an embodiment of the present disclosure. As shown, each trunnion mechanism 100 generally defines an axial direction $A_2$, a radial direction R2, and a circumferential direction $C_2$. The axial direction $A_2$ of the trunnion mechanism 100 may be substantially parallel to the central blade axis 56 (FIG. 1) discussed above, and thus may be substantially parallel to the radial direction $R_1$ defined by the engine 10 of FIG. 1.

Figure 5:
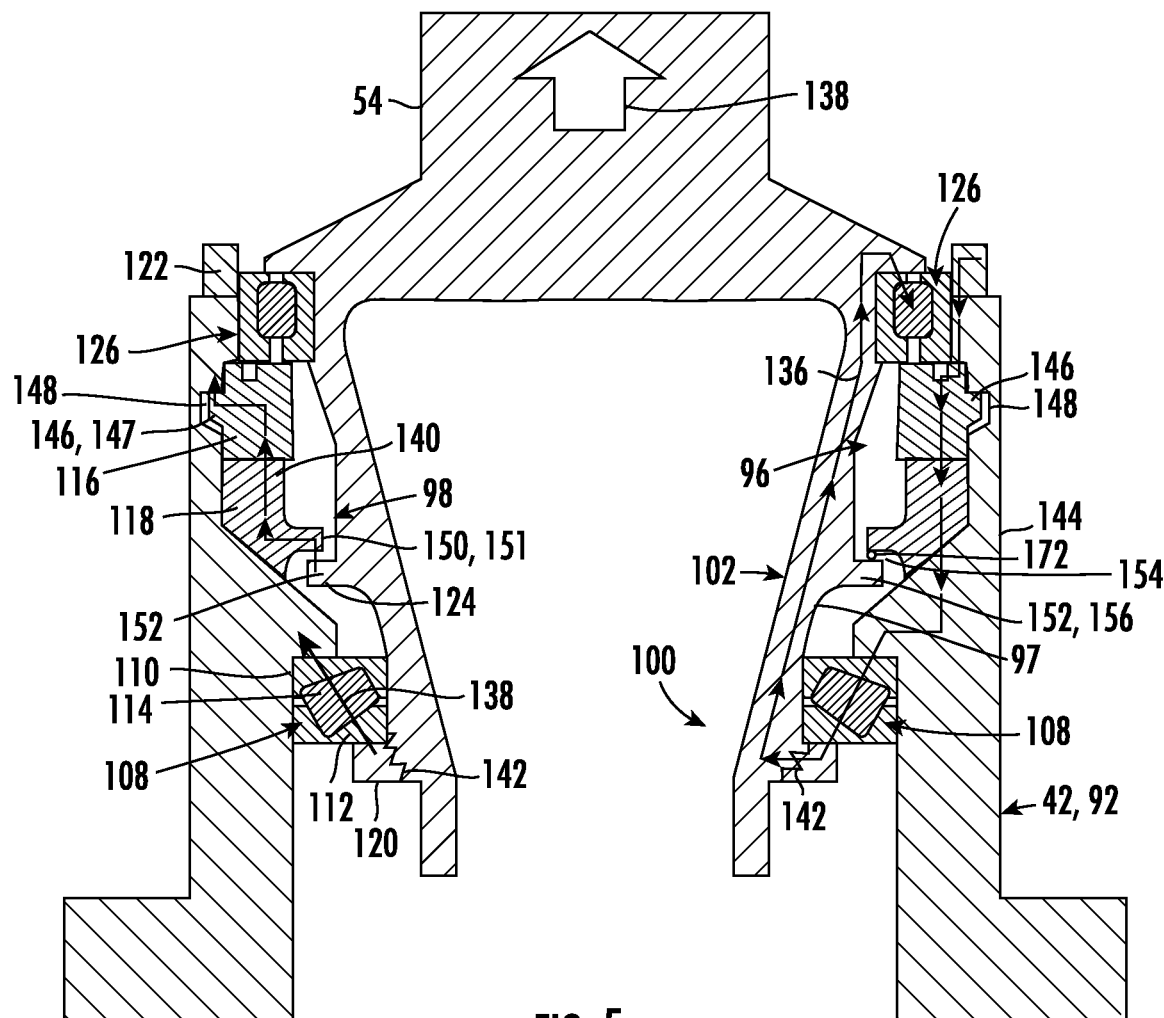
FIG. 5 is a side, cross-sectional view of the disk segment and trunnion mechanism of FIG. 3.

Additionally, as stated, the trunnion mechanism 100 generally includes the trunnion 102 and the first and second attachment systems 96, 98 (see e.g., FIG. 5). Further, as shown, the trunnion 102 generally includes the platform 95 and the shaft 97. The platform 95 of the trunnion 102 defines an axial dovetail slot 104 extending generally along the radial direction R2 of the trunnion mechanism 100 for receipt of a dovetail 106. The dovetail 106 is depicted as an individual component for clarity, however in practice, the dovetail 106 may be a built-in, integral portion of a fan blade 54 (i.e., a root of the fan blade 54). More particularly, for the embodiment depicted, the axial dovetail slot 104 defines an outer end 105 along the radial direction R2 of the trunnion mechanism 100 such that the dovetail 106 may slide into the axial dovetail slot 104 defined in the platform 95. It should be appreciated, however, that in other embodiments, the fan blade 54 may be attached to the disk 42, or the disk segment 92, in any other suitable manner.

For example, in other embodiments, the trunnion mechanism 100 may include a spar-type trunnion, wherein the shaft 97 of the trunnion 102 essentially extends into and forms a frame of the fan blade 54. With such embodiments, the shaft 97 of the trunnion 102 may be formed integrally with at least a portion of the fan blade 54. Additionally, or alternatively, the trunnion mechanism 100 may include a trunnion capable of receiving a pinned root of a fan blade 54. With such an embodiment, a pin may be extended through an opening in the trunnion 102 that aligns with an opening in a root of the fan blade 54.

Referring to FIGS. 3 and 5, the first attachment system 96 generally includes one or more bearings 108, 126, one or more inserts 116 arranged between the trunnion 102 and the disk segment 92, one or more bearing supports 120, 124 (FIG. 5), and at least one coupling nut 122 (FIG. 5). In particular, as shown in FIGS. 3 and 5, the first attachment system 96 may include a first line contact bearing 108 (having, for example, an inner race 110, an outer race 112, and a plurality of rollers 114) and a second line contact bearing 126 (having, for example, an inner race 128, an outer race 130, and a plurality of rollers 132).

As may also be seen in FIG. 5, in the embodiment depicted, the first line contact bearing 108 is oriented at a different angle than the second line contact bearing 126 (as measured from a centerline axis of rollers 114 relative to the axial direction $A_2$, and from a centerline axis of rollers 132 relative to the axial direction $A_2$). More specifically, line contact bearings 108, 126 are preloaded against one another in a face-to-face (or duplex) arrangement, wherein the centerline axes are oriented substantially perpendicular to one another. It should be appreciated, however, that in other embodiments, the line contact bearings 108, 126 may instead be arranged in tandem so as to be oriented substantially parallel to one another.

Additionally, for use as bearings 108, 126, at least the following types of line contacting type rolling element bearings are contemplated: cylindrical roller bearings; cylindrical roller thrust bearings; tapered roller bearings; spherical roller bearings; spherical roller thrust bearings; needle roller bearings; and tapered roller needle bearings. When assembled, the coupling nut 122 (FIG. 5) is engaged with the line contact bearing 126 (or any other suitable component) so as to sandwich the remaining components of trunnion mechanism 100 between coupling nut 122 and the disk segment 92, thereby retaining the trunnion mechanism 100 attached to the disk segment 92.

Figure 4:
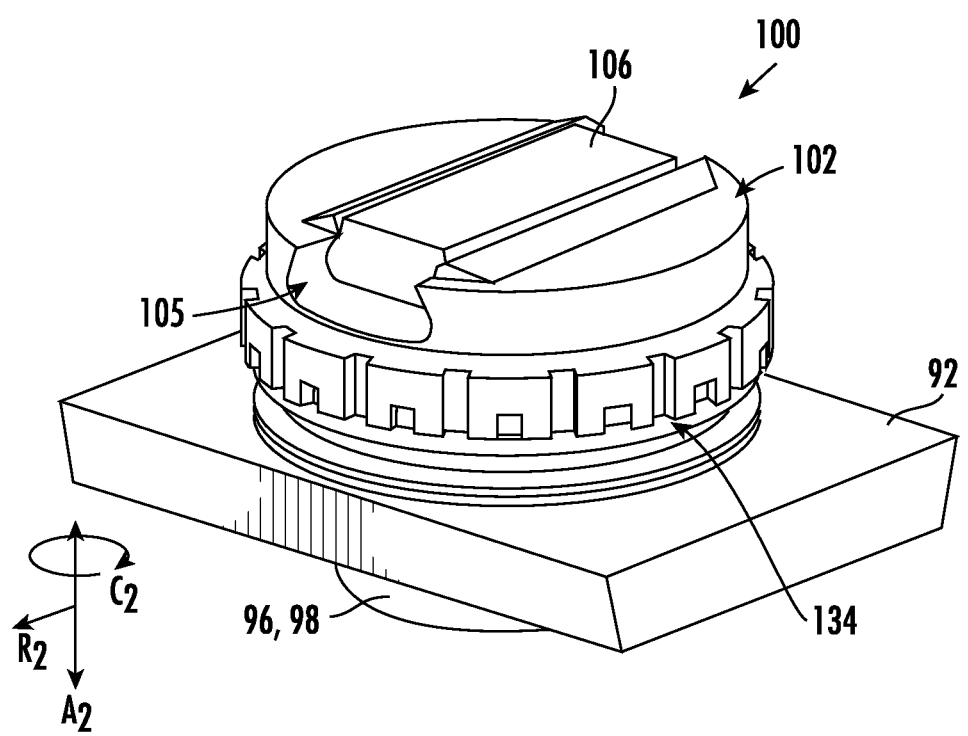
FIG. 4 is a perspective view of the disk segment and trunnion mechanism of FIG. 3.

It should be appreciated, however, that in other embodiments, the first attachment system 96 of the trunnion mechanism 100 may additionally or alternatively include any other suitable type of bearing. For example, in other embodiments, the trunnion mechanism 100 may include roller ball bearings or any other suitable bearing. Further, in still other embodiments, any other suitable first attachment system may be provided for attaching the trunnion 102 to the disk segment 92. Referring now to FIGS. 3-5, the disk segment 92 may also include a collar 134, with the collar 134 extending generally along the axial direction $A_2$ away from the disk segment 92.

Referring now to FIGS. 5-13, various partial views of embodiments of the fan assembly 48 are illustrated. Referring particularly to FIG. 5, a side, cross-sectional view of an embodiment of the disk segment 92 and the trunnion mechanism 100 of the fan assembly 48 according to the present disclosure is illustrated. For example, as shown, the trunnion 102 is attached to the disk segment 92 using the first attachment system 96, e.g., along a preload path 136 defined through the bearings 108, 126, the insert(s) 116, the bearing supports 120, 124, and the coupling nut 122.

Moreover, as shown, the first and second attachment systems 96, 98 include first and second retention features 146, 150, respectively. More specifically, in an embodiment, as shown, the first and second retention features 146, 150 are separate from the preload path 136 (i.e., the load during normal operations does not pass through the first and second retention features 146, 150). As such, during operation of the fan assembly 48, the first attachment system 96 retains the trunnion 102 within the disk 42 along a first load path 138 (e.g., that passes through the trunnion 102, the disk segment 92, and then through the fan blade 54. However, upon a failure in the trunnion 102 (as indicated by reference numeral 142), the first and second retention features 146, 150 together retain the trunnion 102 within the disk segment 92 along a second load path 140. In particular, in an embodiment, as shown in FIG. 5, the first load path 138 is different than the second load path 140 such that a failure 142 in the trunnion 102 does not cause the fan blade 54 to be released from the disk segment 92. Furthermore, as shown, the first and second load paths 138, 140 are defined generally inward of an exterior surface 144 of the disk segment 92 of the disk 42.

In addition, as shown in FIG. 5, the first retention feature 146 of the first attachment system 96 may be a first protrusion 147 of a first insert 116 of the one or more inserts 116 described herein. In such embodiments, as shown, the first protrusion 147 is received within a corresponding first recess 148 of the disk segment 92 of the disk 42.

Figure 6:
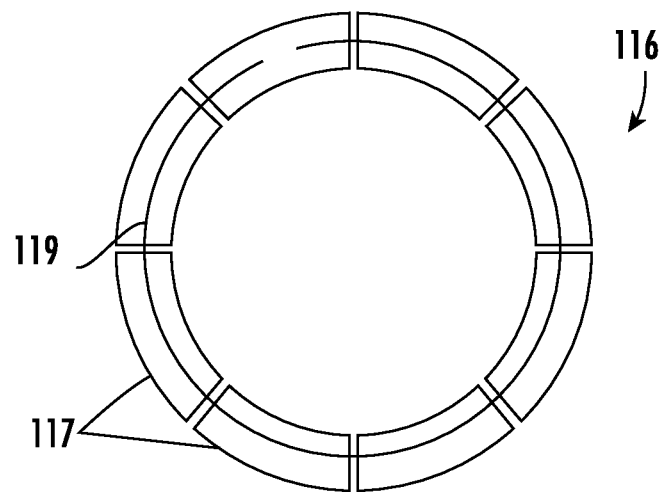
FIG. 6 is a top view of a segmented insert of the fan assembly of FIG. 5.

Moreover, as shown in FIG. 6, the first insert 116 may have a generally annular or ring shape. Thus, in an embodiment, the first insert 116 may be segmented. In particular, as shown particularly in FIG. 6, the first insert 116 may be segmented into a plurality of segments 117 arranged together to form the generally annular or ring shape. In addition, as shown, the plurality of segments 117 of the first insert 116 may be held together using, e.g., a retaining member 119, which may be a spring.

Furthermore, as referring back to FIG. 5, the second retention feature 150 may be a second protrusion 151 of a second insert 118 of the second attachment system 98. In such embodiments, the second protrusion 151 is configured to engage with a corresponding second protrusion 152 of the shaft 97 of the trunnion 102. Moreover, as shown, a gap 154 is maintained between the second protrusion 151 of the second insert 118 and the corresponding second protrusion 152 of the shaft 97 of the trunnion 102 during normal operation of the engine 10.

Accordingly, in an embodiment, upon a failure 142 occurring in the trunnion 102, the gap 154 closes such that the second protrusion 151 of the second insert 118 engages the corresponding second protrusion 152 of the shaft 97 of the trunnion 102 to maintain securement of the trunnion 102 and the fan blade 54 within the disk segment 92 of the disk 42. In such embodiments, as shown, the second load path 140 may be at least partially defined through the first and second protrusions 147, 151 upon the failure 142 of the trunnions 102. Thus, in an example, the first and second retention features 146, 150 are configured to retain the trunnion 102 in the disk segment 92 and together provide redundant retaining capability of the trunnion 102 within the disk 42, or more particularly, to the collar 134 of the disk segment 92.

Figure 7:
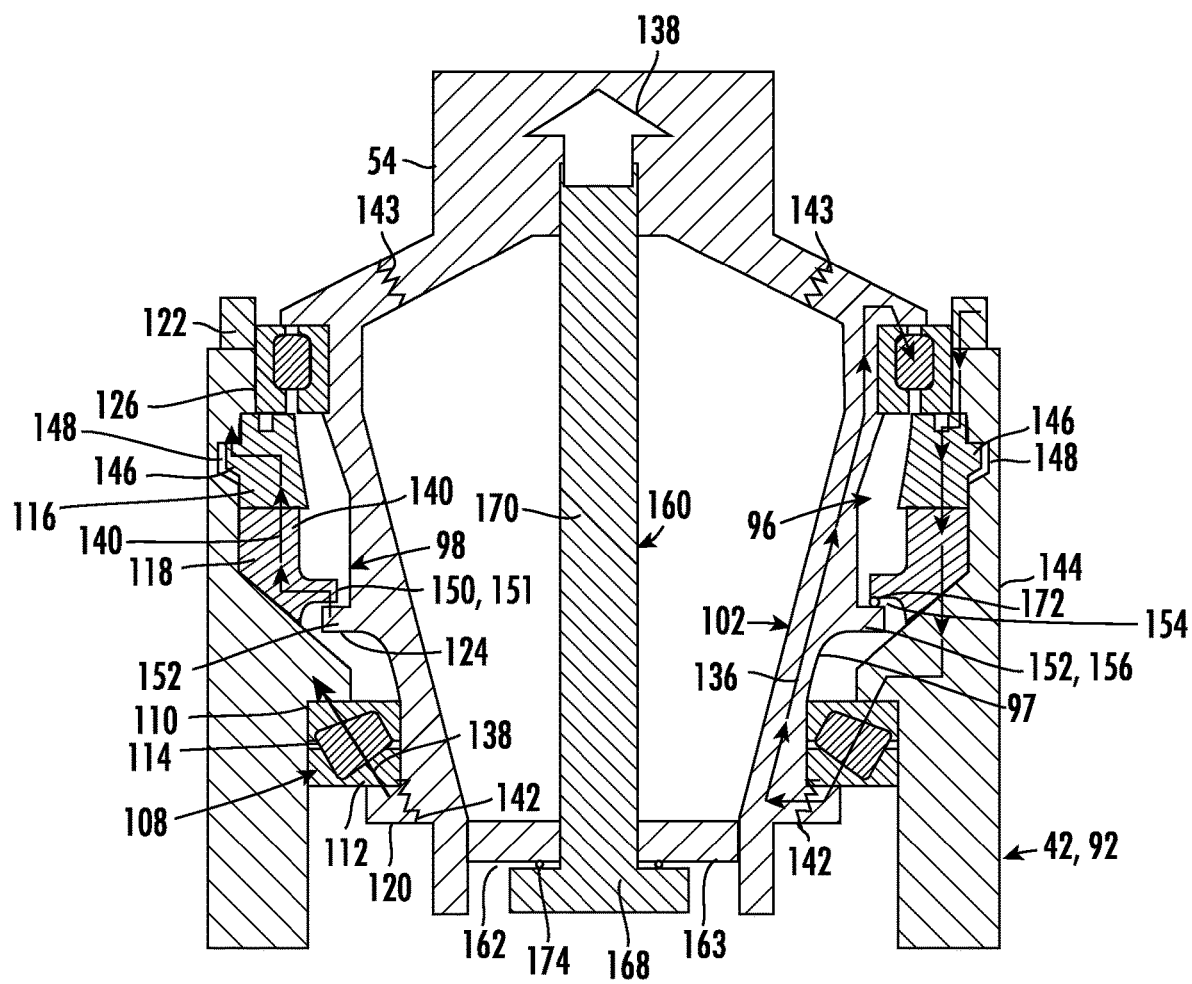
FIG. 7 is a side, cross-sectional view of a portion of a fan assembly of a gas turbine engine, particularly illustrating a disk segment, a trunnion mechanism, and first and second attachment systems in accordance with an embodiment of the present disclosure.
Figure 8:
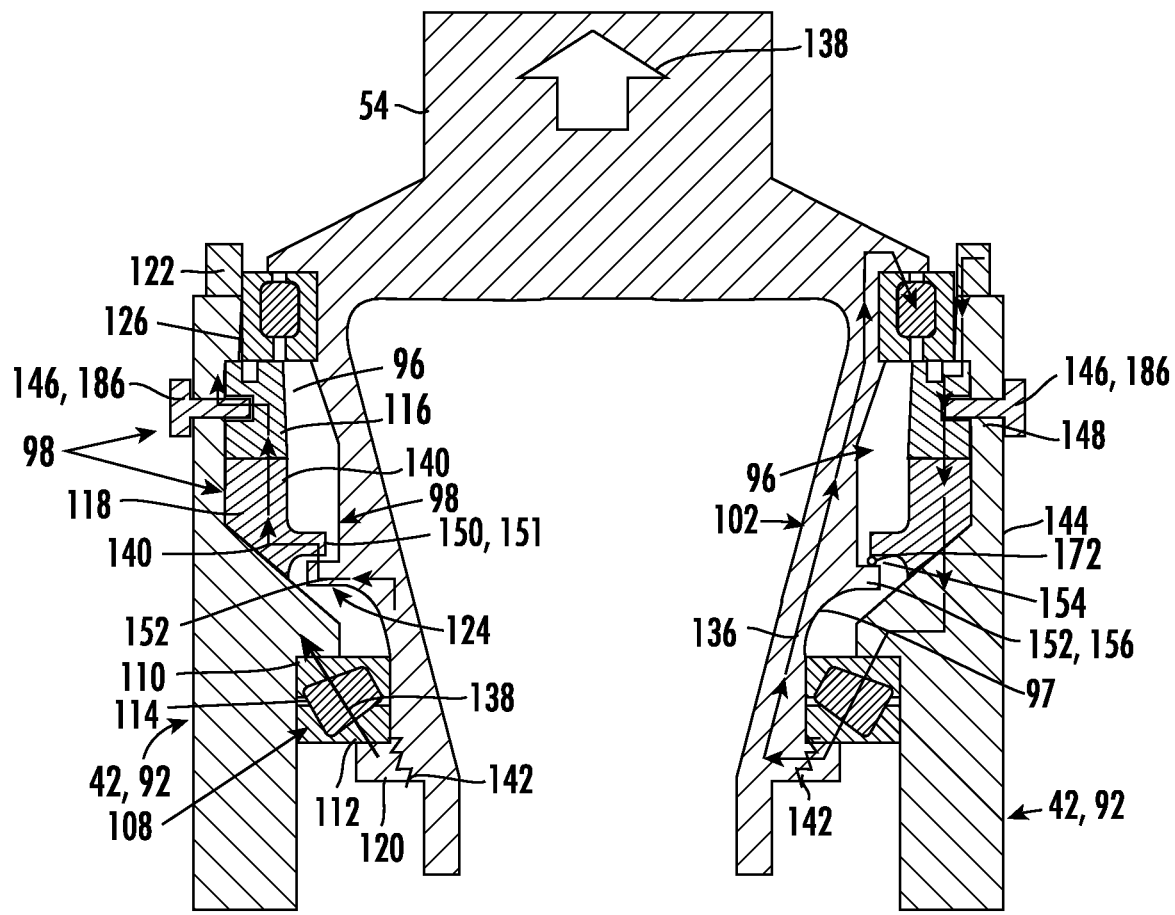
FIG. 8 is a side, cross-sectional view of a portion of a fan assembly of a gas turbine engine, particularly illustrating a disk segment, a trunnion mechanism, and first and second attachment systems in accordance with an embodiment of the present disclosure.
Figure 12:
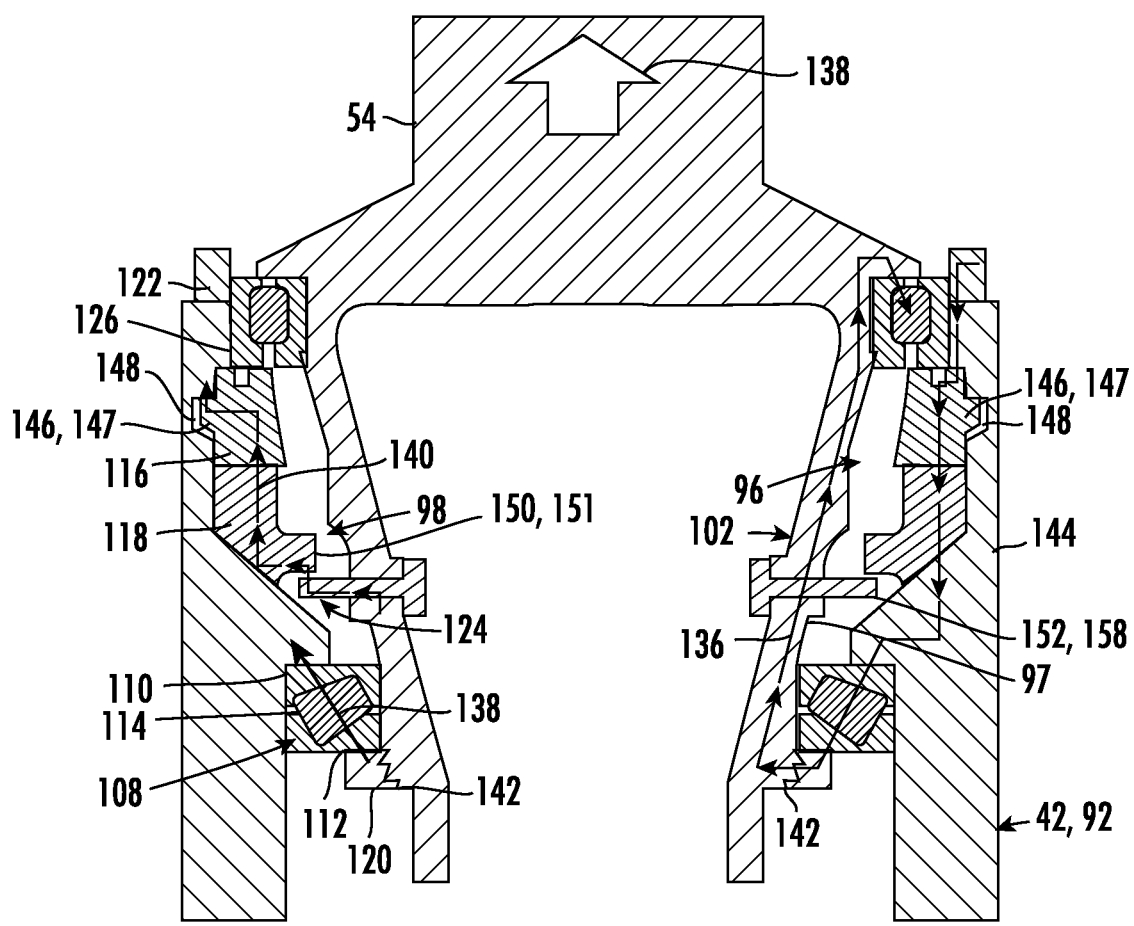
FIG. 12 is a side, cross-sectional view of a portion of a fan assembly of a gas turbine engine, particularly illustrating a disk segment, a trunnion mechanism, and first and second attachment systems in accordance with an embodiment of the present disclosure.
Figure 13:
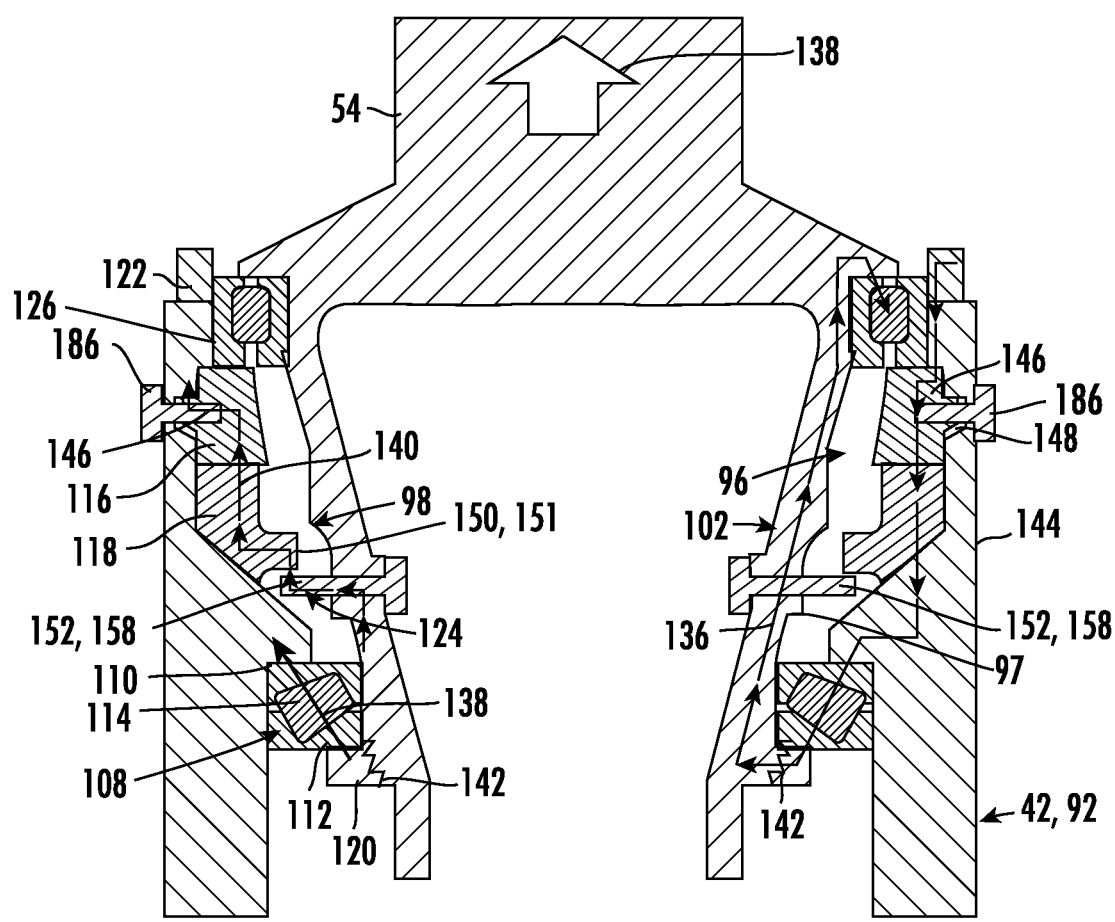
FIG. 13 is a side, cross-sectional view of a portion of a fan assembly of a gas turbine engine, particularly illustrating a disk segment, a trunnion mechanism, and first and second attachment systems in accordance with an embodiment of the present disclosure.

In certain embodiments, as shown in FIGS. 5, 7, and 8, the corresponding second protrusion 152 of the shaft 97 of the trunnion 102 may be a flange 156 formed integrally with the shaft 97. In alternative embodiments, as shown in FIGS. 12 and 13, the corresponding second protrusion 152 of the shaft 97 may be defined by a plurality of fasteners 158 extending through at least a portion of the trunnion 102.

Referring now to FIG. 7, a side, cross-sectional view of another embodiment of the disk segment 92 and the trunnion mechanism 100 of the fan assembly 48 according to the present disclosure is illustrated. In addition to the features illustrated with respect to FIG. 5, the embodiment of FIG. 7 also includes a fastening member 160 extending through the shaft 97 of the trunnion 102 and at least a portion of the fan blade 54. In certain embodiments, for example, the fastening member 160 may be a fastener or a cable. For example, in an embodiment, as shown in FIG. 7, the fastening member 160 is a fastener 166 having a fastener head 168 and a fastener shaft 170. In addition, as shown, the shaft 97 of the trunnion 102 may further be equipped with a flange 163 such that the fastener shaft 170 of the fastener 166 can be received therethrough.

Thus, during normal operation of the engine 10, the fastener head 168 is spaced apart from the flange 163 via a gap 162; a gap 154 is maintained between the second protrusion 151 of the second insert 118 and the corresponding second protrusion 152 of the shaft 97 of the trunnion 102; and the trunnion 102 and the fan blade 54 are maintained within the disk segment 92 of the disk 42 via the first attachment system 96, e.g., as shown along the preload path 136.

Accordingly, in an embodiment, upon failure of the trunnion 102, as indicated at reference numerals 142 and 143, the gaps 154, 162 close, the second protrusion 151 of the second insert 118 engages the corresponding second protrusion 152 of the shaft 97, and the fastener head 168 engages the corresponding flange 163 to maintain securement of the trunnion 102 and the fan blade 54 within the disk segment 92 of the disk 42. In such embodiments, as shown, the second load path 140 may be at least partially defined through the first and second protrusions 147, 151 upon the failure 142 of the trunnion 102. Thus, in an example, the first and second retention features 146, 150 are configured to retain the trunnion 102 in the disk segment 92 should the trunnion 102 fail (even in multiple places as indicated at 142 and 143).

Figure 9:
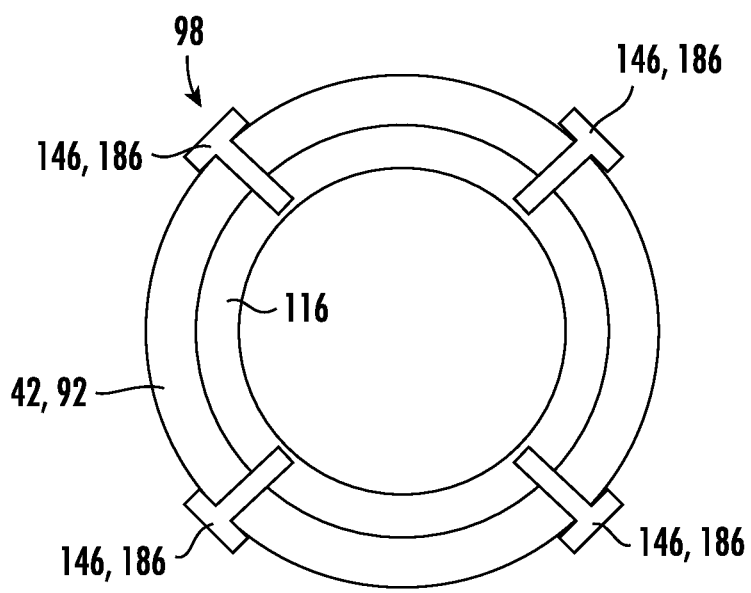
FIG. 9 is a top view of a portion of the fan assembly of FIG. 8, particularly illustrating the disk segment and a first insert.

Referring now to FIGS. 8, 9, and 13, various views of further embodiments of the disk segment 92 and the trunnion mechanism 100 of the fan assembly 48 according to the present disclosure are illustrated. In particular, as shown, the first retention feature 146 of the first attachment system 96 of the embodiment of FIGS. 8, 9, and 13 includes a plurality of fasteners 186 secured through the disk segment 92 of the disk 42 and into the first insert 116. For example, as shown in FIG. 9, the plurality of fasteners 186 may be circumferentially arranged around the disk segment 92. Thus, in an embodiment, the plurality of fasteners 186 can be used in the place of, or in addition to, the first protrusion 147 of the first insert 116. Further, in such embodiments, as shown, the second load path 140 is at least partially defined through the plurality of fasteners 186 (as well as the first and second inserts 116, 118) upon the failure of the trunnion 102.

Figure 10:
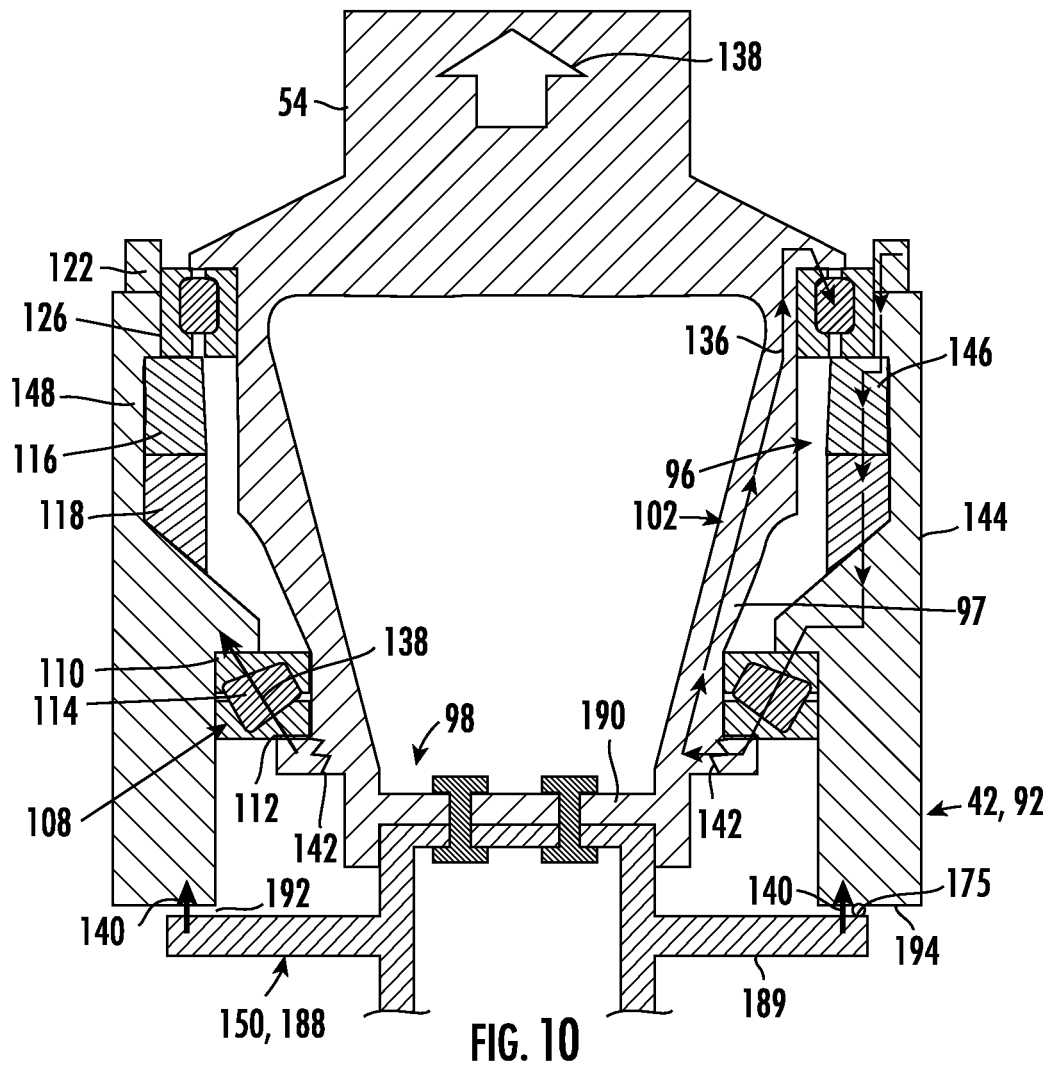
FIG. 10 is a side, cross-sectional view of a portion of a fan assembly of a gas turbine engine, particularly illustrating a disk segment, a trunnion mechanism, and first and second attachment systems in accordance with an embodiment of the present disclosure.
Figure 11:
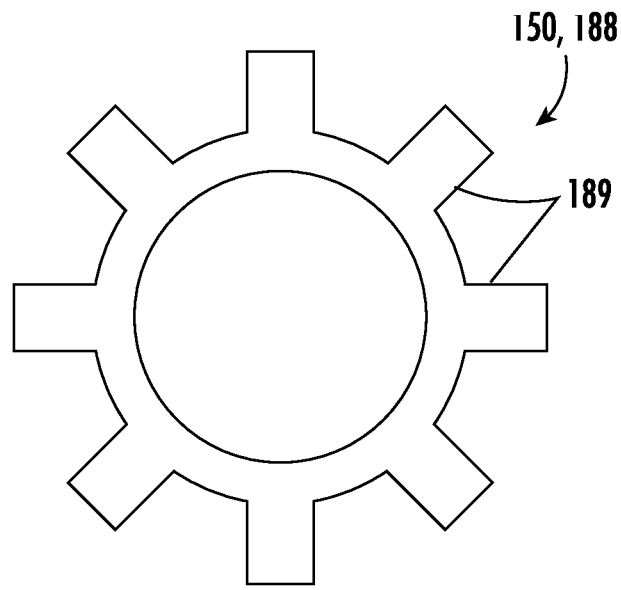
FIG. 11 is a top view of a portion of the fan assembly of FIG. 10, particularly illustrating the disk segment and a first insert.

Referring now to FIGS. 10 and 11, various views of yet another embodiment of the disk segment 92 and the trunnion mechanism 100 of the fan assembly 48 according to the present disclosure are illustrated. In particular, as shown, the second retention feature 150 of the second attachment system 98 of the embodiment of FIGS. 10 and 11 also includes a frame member 188 secured to a flange 190 of the disk segment 92 of the disk 42. In such embodiments, as shown, the second load path 140 is at least partially defined through the frame member 188 upon the failure of the trunnion 102 (as indicated at 142).

More specifically, as shown in FIGS. 10 and 11, during normal operation of the engine 10, one or more radially extending protrusions 189 of the frame member 188 are spaced apart from an edge 194 of the disk segment 92 of the disk 42 via a gap 192. Further, during normal operation of the engine 10, the trunnion 102 and the fan blade 54 are maintained within the disk segment 92 of the disk 42 via the first attachment system 96 along the first load path 138. Accordingly, in an embodiment, upon failure of the trunnion 102, as indicated by reference numeral 142, the gap 192 closes and the radially extending protrusion(s) 189 of the frame member 188 engage (e.g., contacts) the edge 194 of the disk segment 92 of the disk 42 to maintain securement of the trunnion 102 and the fan blade 54 within the disk segment 92 of the disk 42.

In additional embodiments, as shown in FIGS. 5, 7, 8, and 10 the fan assembly 48 may also include at least one sensor 172, 174, 175 for monitoring the gaps 154, 162, 192 as changes in the gaps 154, 162, 192 represent an unbalance of the fan blade 54 and a potential failure in the trunnion 102. In such embodiments, as an example, the sensor(s) 172, 174, 175 may be communicatively coupled with a controller 176 (FIG. 14) configured to generate an alarm in the event of the gaps 154, 162 being closed and/or reduced.

Figure 14:
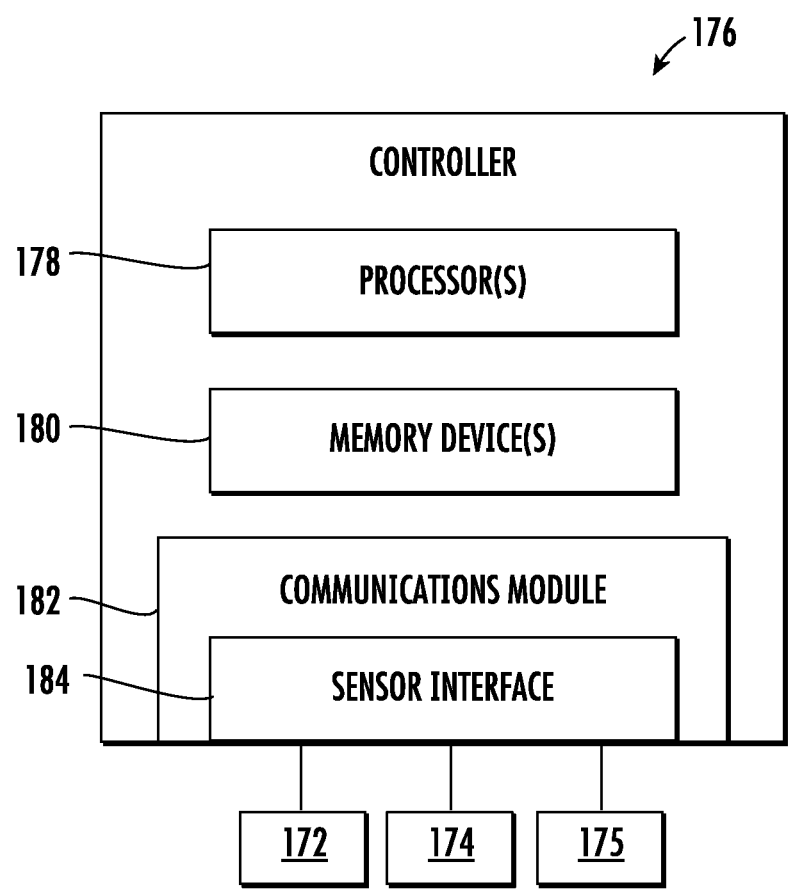
FIG. 14 illustrates a block diagram of components that may be included in a controller in accordance with an embodiment of the present disclosure.

For example, as shown in FIG. 14, a block diagram of components that may be included with the controller 176 according to the present disclosure is illustrated. As shown, the controller 176 may include one or more processors 178 and one or more memory devices 180 configured to perform a variety of computer-implemented functions (e.g., performing the methods, steps, calculations and the like and storing relevant data as disclosed herein). Additionally, the controller 176 may also include a communications module 182 to facilitate communications between the controller 176 and the sensor(s) 172, 174, 175 (FIGS. 5, 7, 8, and 10) described herein.

Further, as shown, the communications module 182 may include a sensor interface 184 (e.g., one or more analog-to-digital converters) to permit signals transmitted from the sensor(s) 172, 174, 175 to be converted into signals that can be understood and processed by the processor(s) 178. It should be appreciated that the sensor(s) 172, 174, 175 may be communicatively coupled to the communications module 182 using any suitable means. For example, as shown in FIG. 14, the sensor(s) 172, 174, 175 may be coupled to the sensor interface 184 via a wired connection. However, in other embodiments, the sensor(s) 172, 174, 175 may be coupled to the sensor interface 184 via a wireless connection, such as by using any suitable wireless communications protocol known in the art. As such, the processor(s) 178 may be configured to receive one or more signals from the sensor(s) 172, 174, 175.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor(s) 178 may also be configured to compute advanced control algorithms and communicate to a variety of Ethernet or serial-based protocols (Modbus, OPC, CAN, etc.) as well as classical analog or digital signals. Additionally, the memory device(s) 180 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 180 may generally be configured to store suitable computer-readable instructions that, when implemented by the processor(s) 178, configure the controller 176 to perform the various functions as described herein.

As will be appreciated from the description herein, various embodiments of a gas turbine engine are provided. Certain of these embodiments may be an unducted, single rotor gas turbine engine, or a ducted turbofan engine. Various additional aspects of one or more of these embodiments are discussed herein. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine.

In one or more of these embodiments, a threshold power or disk loading for a fan (e.g., an unducted single rotor or primary forward fan) may range from 25 horsepower per square foot (hp/ft$^2$) or greater at cruise altitude during a cruise operating mode. In particular embodiments of the engine, structures provided herein generate power loading between 80 hp/ft$^2$ and 160 hp/ft$^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least about 25,000 pounds and less than about 80,000 of thrust during operation at a rated speed, such as between about 25,000 and 50,000 pounds of thrust during operation at a rated speed, such as between about 25,000 and 40,000 pounds of thrust during operation at a rated speed.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet. For example, with reference to the embodiment of FIG. 1, the fan 52 may define a fan diameter as noted above.

In one or more of these embodiments, it will therefore be appreciated that a blade retention system may be incorporated into an engine having an unducted fan with a relatively large diameter. The larger fan diameter may allow for increased efficiencies during at least certain operations and may be facilitated at least in part by a removal of an outer nacelle surrounding the fan. However, increasing a size of the fan may result in a heavier fan blade and removal of the outer nacelle may take away a built in fan blade shield for an aircraft incorporating such an engine. Therefore, an engine having such an unducted fan may have an increased need for a secondary retention feature for the fan blade to reduce a likelihood of a fan blade being liberated from the fan and engine during operation.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio $R_1/R_2$ may be between about 1 and 10, or 2 and 7, or at least about 3.3, at least about 3.5, at least about 4 and less than or equal to about 7, where $R_1$ is the radius of the primary fan and $R_2$ is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps.

A fan pressure ratio (FPR) for the fan of the fan assembly can be 1.04 to 1.20, or in some embodiments 1.05 to 1.1, or in some embodiments less than 1.08, as measured across the fan blades at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0. As such, in some embodiments, the fan can be configured to rotate at a rotational speed of 700 to rpm at a cruise flight condition, while the power turbine (e.g., the low-pressure turbine) is configured to rotate at a rotational speed of 2,500 to 15,000 rpm at a cruise flight condition. In particular embodiments, the fan can be configured to rotate at a rotational speed of 850 to 1,350 rpm at a cruise flight condition, while the power turbine is configured to rotate at a rotational speed of 5,000 to 10,000 rpm at a cruise flight condition.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems.

Further aspects are provided by the subject matter of the following clauses:

A fan assembly for an engine, the fan assembly comprising: a fan blade; a disk having a generally annular shape and comprising a disk segment; a trunnion mechanism comprising a trunnion, a first attachment system, and a second attachment system, the trunnion comprising a platform and a shaft, the fan blade adjacent to the platform of the trunnion, the trunnion extending at least partially through the disk segment and attached to the disk segment using the first attachment system along a preload path, the first and second attachment systems comprising first and second retention features, respectively, separate from the preload path, wherein, during operation of the fan assembly, the first attachment system retains the trunnion within the disk along a first load path, and wherein, upon a failure in the trunnion, the first and second retention features together retain the trunnion within the disk segment along a second load path, the first load path being different than the second load path.

The fan assembly of any preceding clause, wherein the first and second load paths are defined inward of an exterior surface of the disk segment of the disk.

The fan assembly of any preceding clause, wherein the first attachment system comprises one or more bearings, one or more inserts arranged between the trunnion and the disk segment of the disk, one or more bearing supports, and at least one coupling nut.

The fan assembly of any preceding clause, wherein the first retention feature of the first attachment system comprises a first protrusion of a first insert of the one or more inserts, the first protrusion received within a corresponding first recess of the disk segment of the disk, the second load path being at least partially defined through the first protrusion of the first insert upon the failure of the trunnion.

The fan assembly of any preceding clause, wherein the first insert is segmented into a plurality of segments arranged together to form the generally annular or ring shape.

The fan assembly of any preceding clause, wherein the plurality of segments of the first insert are held together using a retaining member.

The fan assembly of any preceding clause, wherein the first retention feature of the first attachment system comprises a plurality of fasteners secured through the disk segment of the disk and into the first insert, the second load path being at least partially defined through the plurality of fasteners upon the failure of the trunnion.

The fan assembly of any preceding clause, wherein the second retention feature of the second attachment system comprises a second protrusion of a second insert, the second insert configured to engage with a corresponding second protrusion of the shaft of the trunnion, wherein upon the failure of the trunnion, the second protrusion of the second insert engages the corresponding second protrusion of the shaft of the trunnion to maintain securement of the trunnion and the fan blade within the disk segment of the disk.

The fan assembly of any preceding clause, wherein the second protrusion is a flange formed integrally with the second insert.

The fan assembly of any preceding clause, wherein the second protrusion is defined by a plurality of fasteners extending through at least a portion of the trunnion.

The fan assembly of any preceding clause, wherein the second attachment system further comprises a fastening member extending through the shaft of the trunnion and at least a portion of the fan blade, wherein upon the failure of the trunnion, the fastening member engages a corresponding flange of the shaft of the trunnion to further retain the trunnion and the fan blade within the disk segment of the disk.

The fan assembly of any preceding clause, further comprising at least one sensor for monitoring a gap between the fastening member and the corresponding flange, wherein, when the gap closes, an unbalance of the fan blade is detectable due to the failure of the trunnion, the at least one sensor communicatively coupled with a controller configured to generate an alarm upon the gap closing.

The fan assembly of any preceding clause, wherein the fastening member comprises at least one of a fastener or a cable.

The fan assembly of any preceding clause, wherein the second attachment system further comprises a frame member secured to a flange of the disk segment of the disk, the second load path being at least partially defined through the frame member upon the failure of the trunnion.

The fan assembly of any preceding clause, wherein the fan assembly is an unducted fan assembly defining a fan diameter of at least 10 feet and up to 28 feet.

An engine, comprising: a core engine; and a variable pitch fan assembly in mechanical communication with the core engine, the fan assembly comprising: a fan blade; a disk having a generally annular shape and comprising a disk segment; a trunnion mechanism comprising a trunnion, a first attachment system, and a second attachment system, the trunnion comprising a platform and a shaft, the fan blade adjacent to the platform of the trunnion, the trunnion extending at least partially through the disk segment and attached to the disk segment using the first attachment system along a preload path, the first and second attachment systems comprising first and second retention features, respectively, separate from the preload path, wherein, during operation of the fan assembly, the first attachment system retains the trunnion within the disk along a first load path, and wherein, upon a failure in the trunnion, the first and second retention features together retain the trunnion within the disk segment along a second load path, the first load path being different than the second load path.

The engine of any preceding clause, wherein the first and second load paths are defined inward of an exterior surface of the disk segment of the disk.

The engine of any preceding clause, wherein the first attachment system comprises one or more bearings, one or more inserts arranged between the trunnion and the disk segment of the disk, one or more bearing supports, and at least one coupling nut.

The engine of any preceding clause, wherein the first retention feature of the first attachment system comprises a first protrusion of a first insert of the one or more inserts, the first protrusion received within a corresponding first recess of the disk segment of the disk, the second load path being at least partially defined through the first protrusion of the first insert upon the failure of the trunnion.

The engine of any preceding clause, wherein the first insert is segmented into a plurality of segments arranged together to form the generally annular or ring shape, and wherein the plurality of segments of the first insert are held together using a retaining member.

The engine of any preceding clause, wherein the second retention feature of the second attachment system comprises a second protrusion of a second insert, the second insert configured to engage with a corresponding second protrusion of the shaft of the trunnion, wherein upon the failure of the trunnion, the second protrusion of the second insert engages the corresponding second protrusion of the shaft of the trunnion to maintain securement of the trunnion and the fan blade within the disk segment of the disk.

This written description uses embodiments to describe the presently disclosed subject matter and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A fan assembly for an engine, the fan assembly comprising:
a fan blade;
a disk having a generally annular shape and comprising a disk segment; and
a trunnion mechanism comprising a trunnion, a first attachment system, and a second attachment system, the trunnion comprising a platform and a shaft, the fan blade adjacent to the platform of the trunnion, the trunnion extending at least partially through the disk segment and attached to the disk segment using the first attachment system along a preload path, the first and second attachment systems comprising first and second retention features, respectively, separate from the preload path,
wherein, during operation of the fan assembly, the first attachment system retains the trunnion within the disk along a first load path, and
wherein, upon a failure in the trunnion, the first and second retention features together retain the trunnion within the disk segment along a second load path, the first load path being different than the second load path.

2. The fan assembly of claim 1, wherein the first and second load paths are defined inward of an exterior surface of the disk segment of the disk.

3. The fan assembly of claim 1, wherein the first attachment system comprises one or more bearings, one or more inserts arranged between the trunnion and the disk segment of the disk, one or more bearing supports, and at least one coupling nut.

4. The fan assembly of claim 3, wherein the first retention feature of the first attachment system comprises a first protrusion of a first insert of the one or more inserts, the first protrusion received within a corresponding first recess of the disk segment of the disk, the second load path being at least partially defined through the first protrusion of the first insert upon the failure of the trunnion.

5. The fan assembly of claim 4, wherein the first insert is segmented into a plurality of segments arranged together to form an annular or ring shape.

6. The fan assembly of claim 5, wherein the plurality of segments of the first insert are held together using a retaining member.

7. The fan assembly of claim 3, wherein the first retention feature of the first attachment system comprises a plurality of fasteners secured through the disk segment of the disk and into the one or more inserts, the second load path being at least partially defined through the plurality of fasteners upon the failure of the trunnion.

8. The fan assembly of claim 3, wherein the second retention feature of the second attachment system comprises a second protrusion of a second insert, the second insert configured to engage with a corresponding second protrusion of the shaft of the trunnion, wherein upon the failure of the trunnion, the second protrusion of the second insert engages the corresponding second protrusion of the shaft of the trunnion to maintain securement of the trunnion and the fan blade within the disk segment of the disk.

9. The fan assembly of claim 8, wherein the second protrusion is a flange formed integrally with the second insert.

10. The fan assembly of claim 8, wherein the second protrusion is defined by a plurality of fasteners extending through at least a portion of the trunnion.

11. The fan assembly of claim 8, wherein the second attachment system further comprises a fastening member extending through the shaft of the trunnion and at least a portion of the fan blade, wherein upon the failure of the trunnion, the fastening member engages a corresponding flange of the shaft of the trunnion to further retain the trunnion and the fan blade within the disk segment of the disk.

12. The fan assembly of claim 11, further comprising at least one sensor for monitoring a gap between the fastening member and the corresponding flange, wherein, when the gap closes, an unbalance of the fan blade is detectable due to the failure of the trunnion, the at least one sensor communicatively coupled with a controller configured to generate an alarm upon the gap closing.

13. The fan assembly of claim 11, wherein the fastening member comprises at least one of a fastener and a cable.

14. The fan assembly of claim 4, wherein the second attachment system further comprises a frame member secured to a flange of the disk segment of the disk, the second load path being at least partially defined through the frame member upon the failure of the trunnion.

15. The fan assembly of claim 1, wherein the fan assembly is an unducted fan assembly defining a fan diameter of at least 10 feet and up to 28 feet.

16. An engine, comprising:
a core engine; and
a variable pitch fan assembly in mechanical communication with the core engine, the fan assembly comprising:
a fan blade;
a disk having a generally annular shape and comprising a disk segment; and
a trunnion mechanism comprising a trunnion, a first attachment system, and a second attachment system, the trunnion comprising a platform and a shaft, the fan blade adjacent to the platform of the trunnion, the trunnion extending at least partially through the disk segment and attached to the disk segment using the first attachment system along a preload path, the first and second attachment systems comprising first and second retention features, respectively, separate from the preload path,
wherein, during operation of the fan assembly, the first attachment system retains the trunnion within the disk along a first load path, and
wherein, upon a failure in the trunnion, the first and second retention features together retain the trunnion within the disk segment along a second load path, the first load path being different than the second load path.

17. The engine of claim 15, wherein the first and second load paths are defined inward of an exterior surface of the disk segment of the disk.

18. The engine of claim 15, wherein the first attachment system comprises one or more bearings, one or more inserts arranged between the trunnion and the disk segment of the disk, one or more bearing supports, and at least one coupling nut, and wherein the first retention feature of the first attachment system comprises a first protrusion of a first insert of the one or more inserts, the first protrusion received within a corresponding first recess of the disk segment of the disk, the second load path being at least partially defined through the first protrusion of the first insert upon the failure of the trunnion.

19. The engine of claim 18, wherein the first insert is segmented into a plurality of segments arranged together to form an annular or ring shape, and wherein the plurality of segments of the first insert are held together using a retaining member.

20. The engine of claim 18, wherein the second retention feature of the second attachment system comprises a second protrusion of a second insert, the second insert configured to engage with a corresponding second protrusion of the shaft of the trunnion, wherein upon the failure of the trunnion, the second protrusion of the second insert engages the corresponding second protrusion of the shaft of the trunnion to maintain securement of the trunnion and the fan blade within the disk segment of the disk.

* * * * *